United States Patent
Panda et al.

(10) Patent No.: US 7,780,597 B2
(45) Date of Patent: Aug. 24, 2010

(54) METHOD AND APPARATUS FOR IMPROVING THE PERFORMANCE OF CAPACITIVE ACOUSTIC TRANSDUCERS USING BIAS POLARITY CONTROL AND MULTIPLE FIRINGS

(75) Inventors: Satchi Panda, Fremont, CA (US); Paul A Wagner, El Cerrito, CA (US); Christopher M Daft, Pleasanton, CA (US); Igal Ladabaum, San Carlos, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1722 days.

(21) Appl. No.: 10/819,094

(22) Filed: Apr. 5, 2004

(65) Prior Publication Data
US 2006/0173342 A1 Aug. 3, 2006

Related U.S. Application Data

(63) Continuation-in-part of application No. 10/367,106, filed on Feb. 14, 2003, now Pat. No. 7,087,023.

(51) Int. Cl.
*A61B 8/00* (2006.01)
(52) U.S. Cl. .............. 600/437; 600/459; 310/318; 310/334; 381/190; 73/602
(58) Field of Classification Search .......... 600/459, 600/437, 443; 310/317, 318, 334, 364; 381/190, 381/191; 73/602, 621, 642
See application file for complete search history.

(56) References Cited

U.S. PATENT DOCUMENTS

| | | | |
|---|---|---|---|
| 2,999,986 A | 9/1961 | Holbrook | |
| 4,145,931 A | 3/1979 | Tancrell | |
| 4,341,120 A | 7/1982 | Anderson | |
| 4,670,683 A | 6/1987 | 't Hoen | |
| 4,694,434 A | 9/1987 | Von Ramm et al. | |
| 4,736,630 A | 4/1988 | Takahashi et al. | |
| 4,888,746 A | 12/1989 | Wurster | |
| 5,229,933 A | 7/1993 | Larson, III | |
| 5,233,993 A | 8/1993 | Kawano | |
| 5,301,168 A | 4/1994 | Miller | |
| 5,415,175 A | 5/1995 | Hanafy et al. | |
| 5,490,512 A | 2/1996 | Kwon et al. | |
| 5,619,476 A * | 4/1997 | Haller et al. | 367/181 |
| 5,627,580 A | 5/1997 | Nelson | |

(Continued)

FOREIGN PATENT DOCUMENTS

DE 32 19 223 11/1983

(Continued)

*Primary Examiner*—Brian Casler
*Assistant Examiner*—Parikha S Mehta

(57) ABSTRACT

Presented is a method of operating a capacitive microfabricated ultrasonic transducer (cMUT) array with multiple firings of varying bias voltage polarity patterns to improve its performance in imaging non-linear media, such as in contrast agent imaging or tissue harmonic imaging. Additionally, transducers incorporating the method are provided. The method of cMUT operation and the corresponding cMUT does not require pre-distortion or phase inversion of the transmit signal and can achieve an improvement in the elevation focus of the cMUT, as compared to the elevation focus that a single firing can achieve. Further, the method of operating the cMUT minimizes the deleterious effects that result from insulators being subjected to high electric fields.

57 Claims, 11 Drawing Sheets

U.S. PATENT DOCUMENTS

| | | | |
|---|---|---|---|
| 5,632,277 A | 5/1997 | Chapman et al. | |
| 5,651,365 A | 7/1997 | Hanafy et al. | |
| 5,671,746 A | 9/1997 | Dreschel et al. | |
| 5,706,819 A | 1/1998 | Hwang et al. | |
| 5,768,007 A | 6/1998 | Knipe et al. | |
| 5,870,351 A * | 2/1999 | Ladabaum et al. | 367/163 |
| 5,894,452 A * | 4/1999 | Ladabaum et al. | 367/163 |
| 5,902,243 A | 5/1999 | Holley et al. | |
| 5,944,666 A * | 8/1999 | Hossack et al. | 600/458 |
| 5,947,904 A * | 9/1999 | Hossack et al. | 600/458 |
| 5,951,478 A | 9/1999 | Hwang et al. | |
| 5,961,463 A | 10/1999 | Rhyne et al. | |
| 5,982,709 A * | 11/1999 | Ladabaum et al. | 367/170 |
| 6,004,832 A * | 12/1999 | Haller et al. | 438/50 |
| 6,102,860 A | 8/2000 | Mooney | |
| 6,104,670 A * | 8/2000 | Hossack et al. | 367/7 |
| 6,108,572 A * | 8/2000 | Panda et al. | 600/407 |
| 6,122,223 A * | 9/2000 | Hossack | 367/11 |
| 6,126,602 A | 10/2000 | Savord et al. | |
| 6,159,153 A | 12/2000 | Dubberstein | |
| 6,172,797 B1 * | 1/2001 | Huibers | 359/291 |
| 6,186,950 B1 | 2/2001 | Averkiou et al. | |
| 6,246,158 B1 * | 6/2001 | Ladabaum | 310/334 |
| 6,271,620 B1 * | 8/2001 | Ladabaum | 310/334 |
| 6,292,435 B1 * | 9/2001 | Savord et al. | 367/138 |
| 6,328,697 B1 * | 12/2001 | Fraser | 600/459 |
| 6,381,197 B1 * | 4/2002 | Savord et al. | 367/178 |
| 6,425,869 B1 | 7/2002 | Rafter et al. | |
| 6,436,046 B1 * | 8/2002 | Napolitano et al. | 600/447 |
| 6,443,901 B1 | 9/2002 | Fraser | |
| 6,461,299 B1 * | 10/2002 | Hossack | 600/437 |
| 6,491,631 B2 * | 12/2002 | Chiao et al. | 600/443 |
| 6,527,723 B2 | 3/2003 | Ossmann et al. | |
| 6,551,248 B2 * | 4/2003 | Miller | 600/459 |
| 6,562,650 B2 | 5/2003 | Ladabaum | |
| 6,571,445 B2 | 6/2003 | Ladabaum | |
| 6,645,145 B1 | 11/2003 | Dreschel et al. | |
| 6,656,123 B2 * | 12/2003 | Jensen et al. | 600/458 |
| 6,676,602 B1 | 1/2004 | Barnes et al. | |
| 6,709,395 B2 | 3/2004 | Poland | |
| 6,749,570 B2 | 6/2004 | Ustuner et al. | |
| 6,795,374 B2 * | 9/2004 | Barnes et al. | 367/138 |
| 7,087,023 B2 | 8/2006 | Daft et al. | |
| 7,311,667 B2 | 12/2007 | Cai et al. | |
| 7,508,113 B2 | 3/2009 | Daft et al. | |
| 2003/0048698 A1 * | 3/2003 | Barnes et al. | 367/181 |
| 2005/0119575 A1 | 6/2005 | Ladabaum et al. | |

FOREIGN PATENT DOCUMENTS

| | | |
|---|---|---|
| EP | 0 978 822 A2 | 2/2000 |
| WO | WO 0030543 | 6/2000 |
| WO | PCTUS2004002740 | 7/2004 |

* cited by examiner

METHOD AND APPARATUS FOR IMPROVING THE PERFORMANCE OF CAPACITIVE ACOUSTIC TRANSDUCERS USING BIAS POLARITY CONTROL AND MULTIPLE FIRINGS

CROSS-REFERENCE TO RELATED APPLICATIONS

The present application is a continuation-in-part of, and claims the benefit of priority under 35 U.S.C. §120 from, commonly assigned application Ser. No. 10/367,106, now U.S. Pat. No. 7,087,023 to Daft et al. filed on Feb. 14, 2003 and entitled "Microfabricated Ultrasonic Transducers with Bias Polarity Beam Profile Control and Method of Operating the Same," which is hereby incorporated in its entirety and for all purposes.

The present application additionally claims the benefit of priority under 35 U.S.C. §119(e) from U.S. Provisional Patent Application No. 60/460,638 to Panda et al. filed on Apr. 4, 2003 and entitled "Method and Apparatus for Improving the Performance of Capacitive Acoustic Transducers using Bias Polarity Control and Multiple Firings," which is hereby incorporated by reference in its entirety and for all purposes.

FIELD OF THE INVENTION

Generally, the present invention relates to the field of acoustic transducers. More specifically, the present invention relates to the focus optimization of capacitive microfabricated ultrasonic transducers.

BACKGROUND OF THE INVENTION

An acoustic transducer is an electronic device used to emit and receive sound waves. Ultrasonic transducers are acoustic transducers that operate at frequencies above 20 KHz, and more typically, in the 1-20 MHz range. Ultrasonic transducers are used in medical imaging, non-destructive evaluation and other applications. The most common forms of ultrasonic transducers are piezoelectric transducers. In U.S. Pat. No. 6,271,620 entitled, "Acoustic Transducer and Method of Making the Same," issued Aug. 7, 2001, Ladabaum describes microfabricated acoustic transducers capable of competitive performance compared to piezoelectric transducers. The basic transduction element of the microfabricated ultrasonic transducer (MUT) described by this prior art is a vibrating capacitor. A substrate contains a lower electrode, a thin diaphragm is suspended over the substrate and a metalization layer serves as an upper electrode. If a DC bias is applied across the lower and upper electrodes, an acoustic wave impinging on the diaphragm will set it in motion, and the variation of electrode separation caused by such motion results in an electrical signal. Conversely, if an AC signal is applied across the biased electrodes, an AC forcing function will set the diaphragm in motion, and this motion emits an acoustic wave in the medium of interest.

Capacitive transducers can transmit harmonics because the force on the diaphragm is proportional to the square of the applied voltage excitation waveform. Further non-linearity stems from the fact that the force on the diaphragm is also dependent, in a quadratic manner, on the position of the diaphragm relative to its resting state. Because broadband transducer designs have diaphragms that respond to such non-linear forcing functions in a meaningful manner, they transmit harmonics. Harmonic transmission from the transducer is undesirable in tissue harmonic imaging and contrast agent imaging because these imaging modalities are based on forming images with harmonics generated by the tissue or the contrast agent, not by the harmonics transmitted by a sub-optimal transmitter.

The use of pre-distorted input signals in electronic systems so as to reduce the harmonic content of an output signal is a technique that has been used in electronics for a long time and is well known in the art. For example, Holbrook et al., in U.S. Pat. No. 2,999,986 issued in 1961, teach a pre-distortion technique to reduce harmonics generated by a non-linear vacuum tube. Savord et al. received U.S. Pat. No. 6,292,435 for the application of pre-distorted signals to capacitive microfabricated ultrasonic transducers (cMUT). Fraser received U.S. Pat. No. 6,443,901 also for the application of pre-distorted signals to cMUTs. Hossack, in U.S. Pat. No. 6,461,299 teaches different pre-distortion methods to those taught in Savord et al. and Fraser. Savord et al., Fraser, and Hossack exclusively teach pre-distortion approaches to remove harmonics from the transmit signal. Pre-distortion approaches place design challenges on a system's transmitter. At best, they require a sophisticated and relatively expensive transmitter. At worst, the approach requires an entirely new ultrasound system to operate cMUTs in harmonic imaging mode.

A further significant disadvantage of the pre-distorted transmit signal approach is that it will not work in combination with the multi-polarity biased cMUT elements disclosed in the commonly owned U.S. patent application Ser. No. 10/367,106 filed Feb. 14, 2003, which has previously been incorporated by reference. For example, the appropriate pre-distortion for a positively biased cMUT is different from the appropriate pre-distortion for a negatively biased cMUT. Thus, when a transducer element contains both positive and negative bias regions, no single pre-distorted waveform can effectively cancel harmonic transmission from both the positive and negative bias regions. It is thus desirable to operate cMUTs for harmonic imaging in a manner that does not require pre-distorted transmit signals.

In U.S. Pat. No. 5,233,993, Kawano teaches a method whereby an ultrasound system forms an image based on the combination of two echoes from two transmit signals in the same scanning direction. In U.S. Pat. No. 5,632,277 Chapman et al. teach a method of generating an ultrasound image that enhances regions of non-linear scattering media by using two transmit signals 180 degrees apart in phase. In such an approach, the received echoes from linear media will be opposites of each other and cancel if added, but if a region is non-linear, there will be no significant difference in the received echoes of the harmonic energy. Further, Hwang et al., in U.S. Pat. Nos. 5,706,819 and 5,951,478, teach specifics of such an approach for imaging with contrast agents. Averkiou et al., in U.S. Pat. No. 6,186,950 introduces improvements to such pulse inversion harmonic imaging by using more than two transmit pulses per frame. U.S. Pat. No. 5,902,243 to Holley et al. and U.S. Pat. No. 5,961,463 to Rhyne et al. teach specifics of useful transmit waveforms. Common to all such prior art is that the only method taught for producing suitable transmit waveforms is to use the signal generator of the ultrasound system to distort, encode, or phase invert the transmit waveforms. It is therefore desirable to have a method for harmonic imaging that can relax or obviate these signal generator requirements of the ultrasound system's transmitter.

It has been realized by the present inventors that reversing the bias polarity of a cMUT is an effective means of introducing a 180 degree phase shift to the fundamental component of excitation waveform. When transmit signals are small compared to the bias voltage on a cMUT so that the cMUT is operating in a fairly linear range, the bias on the cMUT can be used to implement pulse inversion harmonic imaging with a simple transmitter.

It has been further realized by the present inventors that reversing the bias polarity of a cMUT introduces a 180 degree phase shift on the odd harmonics of a transmit waveform (i.e. if the fundamental is at frequency f, odd harmonics are at 3 f, 5 f etc.), but does not affect the even harmonics (i.e. 2 f, 4 f, etc.). Thus, such bias inversion can be used to enhance the harmonic image from media with scattering in the odd harmonic frequency range.

It has also been realized by the present inventors that a tight spatial distribution of alternating bias polarity across a cMUT element's aperture results in a transducer whose fundamental content is effectively canceled, but whose even harmonic content is the same as that of a cMUT with the same polarity bias across its aperture. Thus, the present inventors have discovered a mode of operating a cMUT in such a way that only its even harmonic content effectively radiates. When used in a method of multiple transmit firings and received signal combinations, this harmonic-only mode of operation can be used to remove the effects of cMUT generated harmonics. This is particularly valuable in tissue harmonic imaging or contrast agent imaging where high transmit powers are required, and where it is likely that cMUT generated harmonics will be significant.

It has been further realized by the present inventors that the focusing of the bias polarity, as disclosed in the commonly owned U.S. patent application Ser. No. 10/367,106 filed Feb. 14, 2003, is dispersive. This dispersion can be used to reduce transmitted second harmonic in the focal region of interest, then on receive, switch the spatial distribution of bias polarities to preferentially enhance the tissue generated harmonics received from the focal area of interest. Such dispersion is useful in general, not just for harmonic imaging, because it provides for a way of trading tightness of focus and depth of field via the frequency content of the transmit pulse.

Thus, the polarity of bias on the cMUT and the spatial distribution of such bias polarity patterns can modulate the phase and harmonic content of a cMUT's acoustic transmission. This bias-polarity-based modulation can be used to enhance the performance of cMUTs in harmonic imaging.

Further still, the combination of spatially distributed bias amplitude and polarity distributions with multiple transmit firings can be used to optimize the images rendered by cMUTs, whether harmonic or not.

Finally, in the course of experimentation, the present inventors have realized that periodically switching the bias polarity across a cMUT element can improve its performance with regard to degenerative processes such as charge trapping. It is thus desirable, even in the case were none of the advantages of harmonic imaging, elevation focusing, or elevation steering are relevant, that cMUTs be operated in such a manner to periodically reverse the polarity of the biasing electric field.

SUMMARY OF THE INVENTION

The present invention provides methods of optimizing the performance of cMUT arrays, with emphasis placed on improvements in harmonic imaging.

In commonly owned U.S. patent application Ser. No. 10/367,106 filed Feb. 14, 2003, Daft et al. teach that the phase profile of an ultrasonic beam can be controlled with bias polarity. The Daft et al. application claims that the bias polarity pattern and bias voltages can change as functions of time. However, specific methods of multiple firings and combinations of such firings, as disclosed herein, are not taught.

The present invention provides a method of operating a bias polarity controlled microfabricated ultrasonic transducer to improve its performance in imaging non-linear media, such as in contrast agent imaging or tissue harmonic imaging.

The present invention further provides a method of imaging non-linear media in a manner that does not require pre-distortion or phase inversion of the transmit signal.

Further still, the present invention provides a method of using multiple firings of a bias polarity controlled cMUT to achieve an improvement in the elevation focus of the cMUT, as compared to the elevation focus that a single firing can achieve.

Additionally, the present invention provides a method of operating a cMUT so as to minimize the deleterious effects that result from insulators being subjected to high electric fields.

The present invention achieves these and other improvements in the art by providing a method of operating a transducer with various firing sequences of bias polarity patterns.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
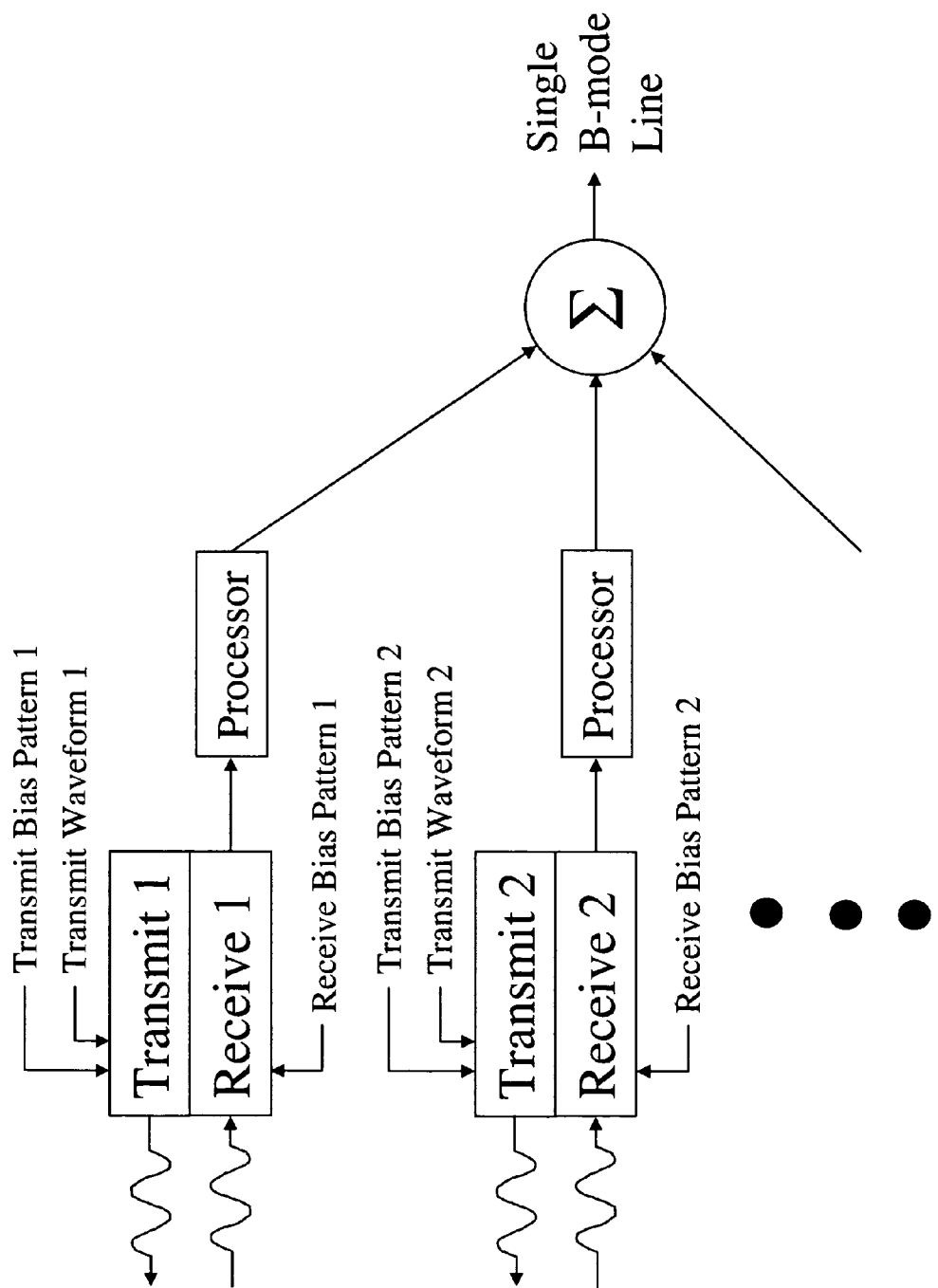
FIG. 1 contains a schematic of the most general concept of the present invention.

The present invention relates to capacitive microfabricated ultrasonic transducer (cMUT) arrays with bias voltage control. FIG. 1 illustrates the concepts of the present invention. As shown in FIG. 1, the invention in its most general form comprises combining data received from multiple transmit-receive events to form a single output waveform. For example, each transmit and receive event can have, among other characteristics, a unique transmit bias pattern, a unique receive bias pattern, a unique transmit signal, and a unique receive signal processing algorithm. Unless otherwise noted throughout this specification, the voltage magnitude of the bias patterns will depend on the requirements of the precise design employed. In general though, the voltage magnitude of a bias is desired to be as large as possible without leading to the phenomenon known in the art as diaphragm pinning (i.e., also know as touch-down, pull-in, or collapse), which is application dependent. While it will become apparent to those skilled in the art that the invented scheme described in the present application can be used for many applications, only the embodiments relevant to the leading applications are described herein.

The present invention uses a cMUT array having individually addressable DC bias lines running orthogonally to the transducer elements. In this context, transducer elements are made up of individual transducer cells and groups of elements form the cMUT array. For example, the transducer elements can form columns in the elevation direction and the side-by-side elements can form the cMUT array along the azimuth direction. This specific transducer design is fully disclosed in commonly owned U.S. patent application Ser. No. 10/367,106 filed Feb. 14, 2003. The present invention provides, among other aspects, a new way to control and process the bias profile of such a cMUT array over the course of multiple firings so as to make the cMUT suitable for use in harmonic imaging.

A first embodiment of the present invention provides a technique to subtract out harmonic distortion arising from the non-linear behavior of a cMUT. This is accomplished through manipulation of the transducer element's elevation bias patterns over a series of sequential firings in such a way that the-combination (e.g., the weighted sum) of these firings causes the non-linear components in the cMUT's pressure output to cancel. In this embodiment, the series of sequential firings occurs on the transducer element for the same image area, in this example, the same elevation image slice. Such elimination of generated harmonics greatly improves the quality of tissue-generated or contrast-agent-generated harmonic images made with a cMUT. Furthermore, the present invention achieves this improvement in harmonic performance without the necessity of having arbitrary radio frequency (RF) waveform generator capability in the ultrasound imaging system.

Figure 2:
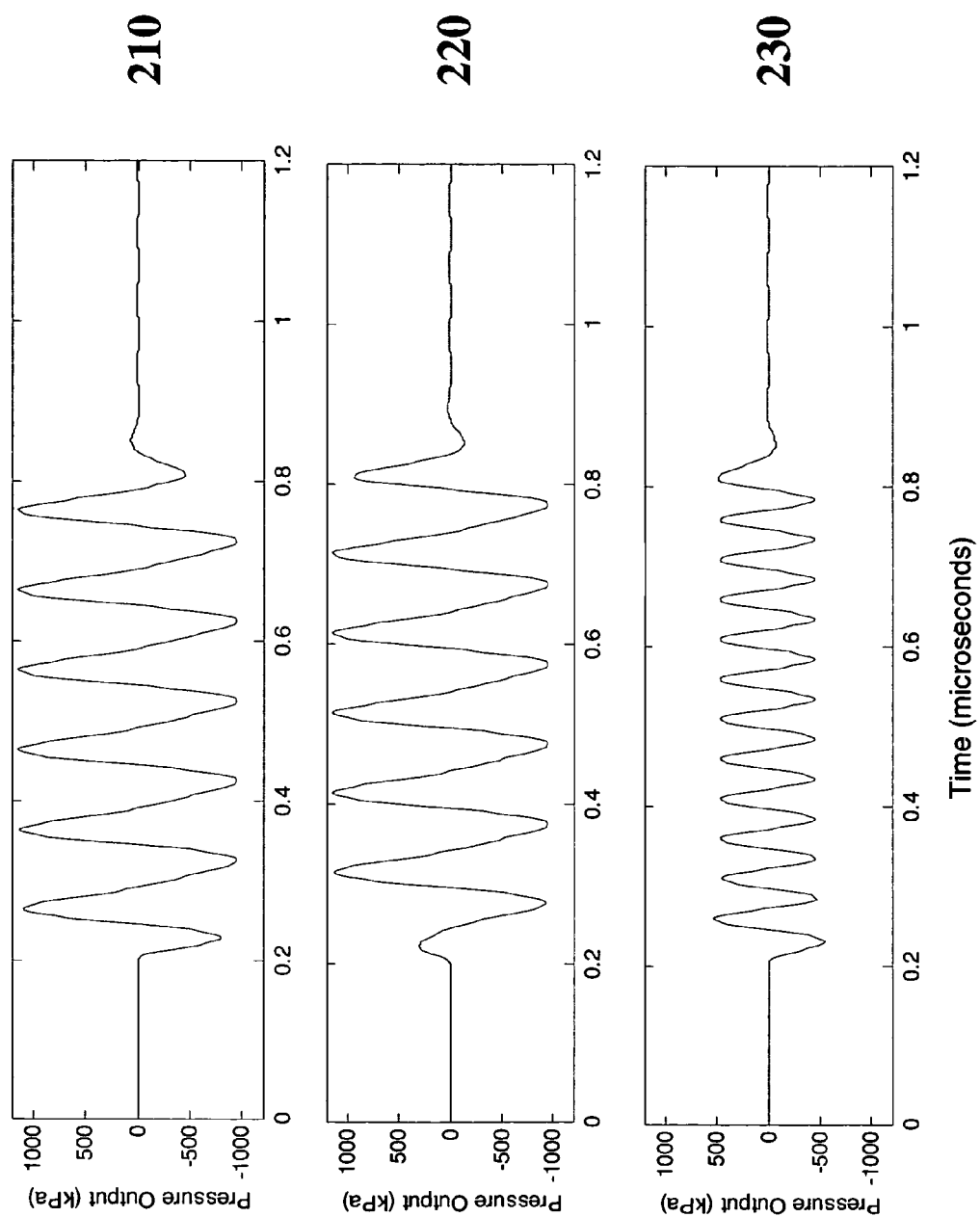
FIG. 2 shows the output of computer simulations for positive polarity bias, negative polarity bias, and the combination of the positive and negative polarity biases.

FIG. 2 illustrates the nonlinear nature of a simulated cMUT when large pressure outputs from the transducer are required. In all of the simulations shown in FIG. 2, the cMUT is excited by a 10 MHz, linear, 6-cycle sinusoidal voltage added to a DC bias of about 70 Volts in magnitude. The top chart 210 of FIG. 2 shows the pressure output. from the cMUT when the DC bias voltage polarity is positive (+70 Volts). The middle chart 220 of FIG. 2 shows the cMUT's pressure output from the same forcing function, but where the DC bias voltage polarity is negative (−70 Volts). The bottom chart 230 of FIG. 2 is the result of combining the output values of the top chart 210 to the output values of the middle chart 220. The 2 f harmonic (20 MHz) is clearly visible in the bottom chart 230, while the 1 f fundamental frequency (10 MHz) is absent. This happens because inverting the DC bias voltage polarity from 210 to 220 inverts the 1 f fundamental component, but leaves the 2 f harmonic component unchanged.

Figure 3:
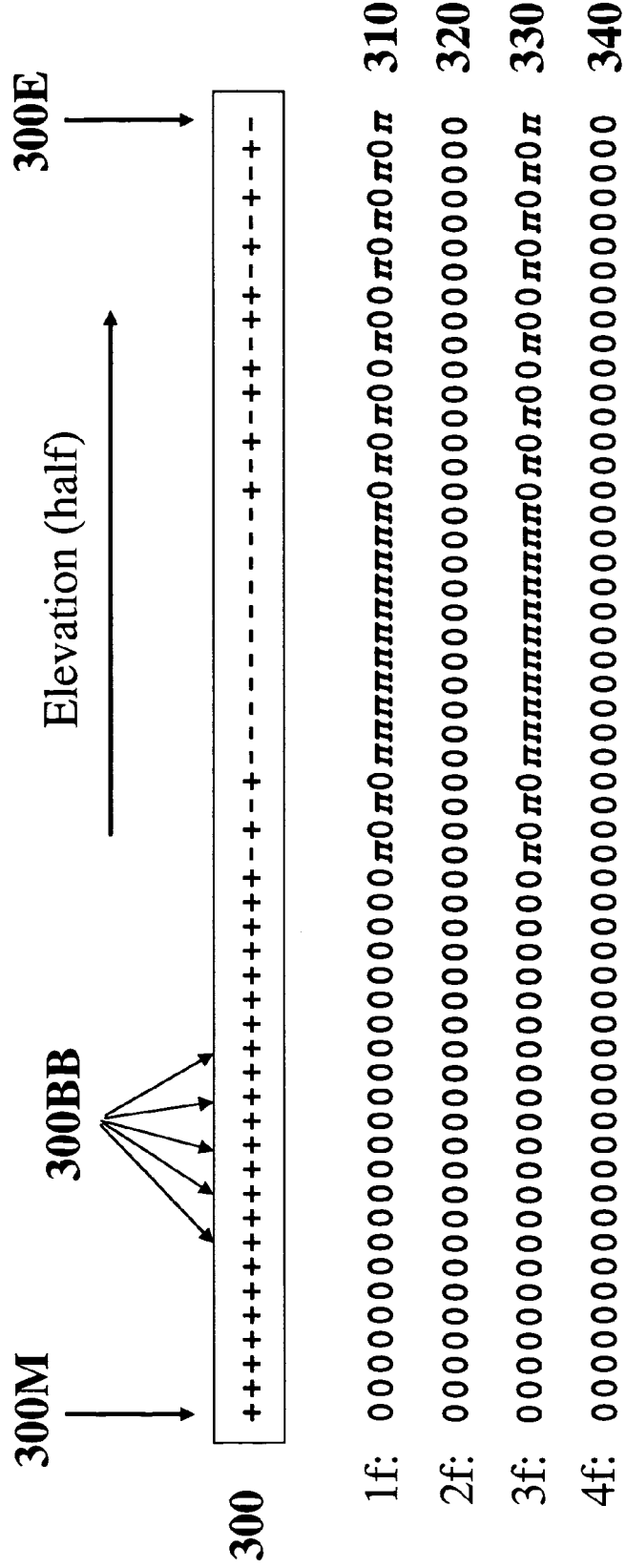
FIG. 3 illustrates half of an elevation bias pattern and the corresponding phases of harmonic waveforms for an embodiment of the present invention.

FIG. 3 illustrates the transmit pressure behavior of a cMUT array with a bias profile designed to produce an elevation focus at 20 mm depth. Focusing in elevation is defined as the "standard mode of operation" for such a cMUT array. Only half of the transducer element elevation bias profile 300 is shown, 300M being the midpoint in the elevation direction, and 300E being one of the edges (the other half of the profile is identical to the half shown, without repeating the midpoint 300M). Situated below the bias pattern 300 is the phase of the pressure output (relative to the pressure output of a positively biased fundamental) corresponding to each bias-block 300BB along the half-elevation, repeated for 4 harmonic components 1 f 310, 2 f 320, 3 f 330, and 4 f 340. In this case, 1 f 310 is the fundamental linear component of the cMUT pressure output, and 2 f 320, 3 f 330, and 4 f 340 are the harmonic components arising from the non-linear nature of the cMUT. Significance to the present invention is the fact that all odd transmitted harmonic components (e.g., 1 f 310 and 3 f 330) have bias-block phases that track the polarity of the applied DC bias voltage, while all even transmitted harmonic components (e.g., 2 f 320 and 4 f 340) have a constant phase that is independent of the applied DC bias voltage.

Figure 4:
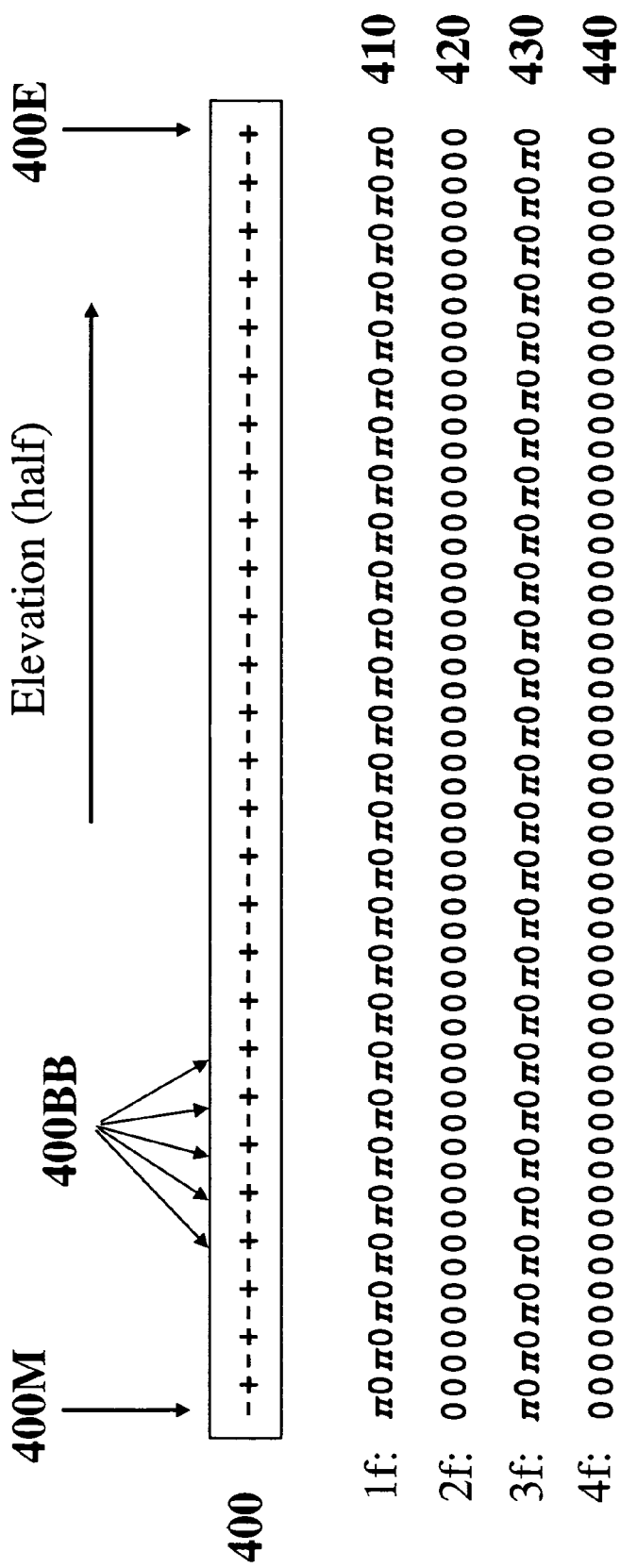
FIG. 4 depicts half of a bias pattern according to an embodiment of the present invention applied to suppress the fundamental and odd harmonics.

FIG. 4 illustrates the behavior of a cMUT array with an "alternating" bias profile 400 designed to suppress radiation of the fundamental mode (and more generally, radiation of all odd harmonic frequencies). Such a bias profile 400 is characterized by adjacent regions of opposite bias polarity that are spaced as finely as allowed by the bias-blocks 400BB. Only half of the transducer element elevation bias profile 400 is shown, 400M being the midpoint in the elevation direction, and 400E being one of the edges (the other half of the profile is identical to the half shown, without repeating the midpoint 400M). Shown below the bias pattern 400 is the relative phase output corresponding to each bias-block 400BB along the half-elevation, repeated for 4 main fundamental and harmonic components 1 f 410, 2 f 420, 3 f 430, and 4 f 440. These phase profiles highlight an important aspect of this embodiment of the present invention. Specifically, those phase profiles that alternate between 0 and π from bias-block to bias-block prevent the corresponding frequency component from radiating into the field, provided that the pitch between adjacent bias blocks is smaller than one wavelength at that fundamental frequency. As is apparent from FIG. 4, even harmonic components (e.g., 2 f 420 and 4 f 440) radiate, while odd harmonic components (e.g., 1 f 410 and 3 f 430) do not.

Figure 5:
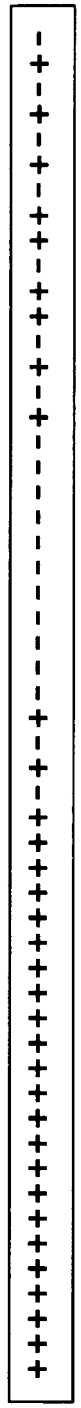
FIG. 5 illustrates a firing sequence for an embodiment of the present invention.

FIG. 5 depicts the bias profiles used for both transmit (T) and receive (R) in the sequence of three consecutive firings 510, 520, 530 that make up another embodiment of the present invention. As in other figures, only half of the elevation bias profile is shown. In the first firing 510, the cMUT array is operated in standard transmit mode 510T with a conventional elevation focus (in this case, at 20 mm depth, as discussed in relation to FIG. 3) optimized for 1 f frequencies. Directly after transmitting, the bias pattern is switched to the first firing receive bias pattern 510R before any echoes are received. The first firing receive bias pattern 510R is a conventional elevation focus optimized for 2 f frequencies. The second firing 520 shown in FIG. 5 uses transmit bias pattern 520T, which is the polarity inverse of the transmit pattern used in the first firing 510, and uses the same receive bias pattern 520R as the first firing 510 receive bias pattern 510R. Inverting the second firing 520 transmit bias pattern 520T causes the fundamental frequency and all odd generated harmonics in the second firing 520 to invert relative to their counterparts in the first firing 510. In all other respects, the first firing 510 and the second firing 520 are identical. In the third firing 530 the cMUT array is operated in an alternating bias polarity profile mode on transmit 530T, which results in the suppression of the fundamental frequency and all odd generated harmonics. More specifically, in the third firing 530, only the even generated harmonics are transmitted into the transmission medium. The receive bias pattern 530R of the third firing 530 is identical to the bias polarity patterns used on receive in the previous two firings 510, 520.

Figure 6A:
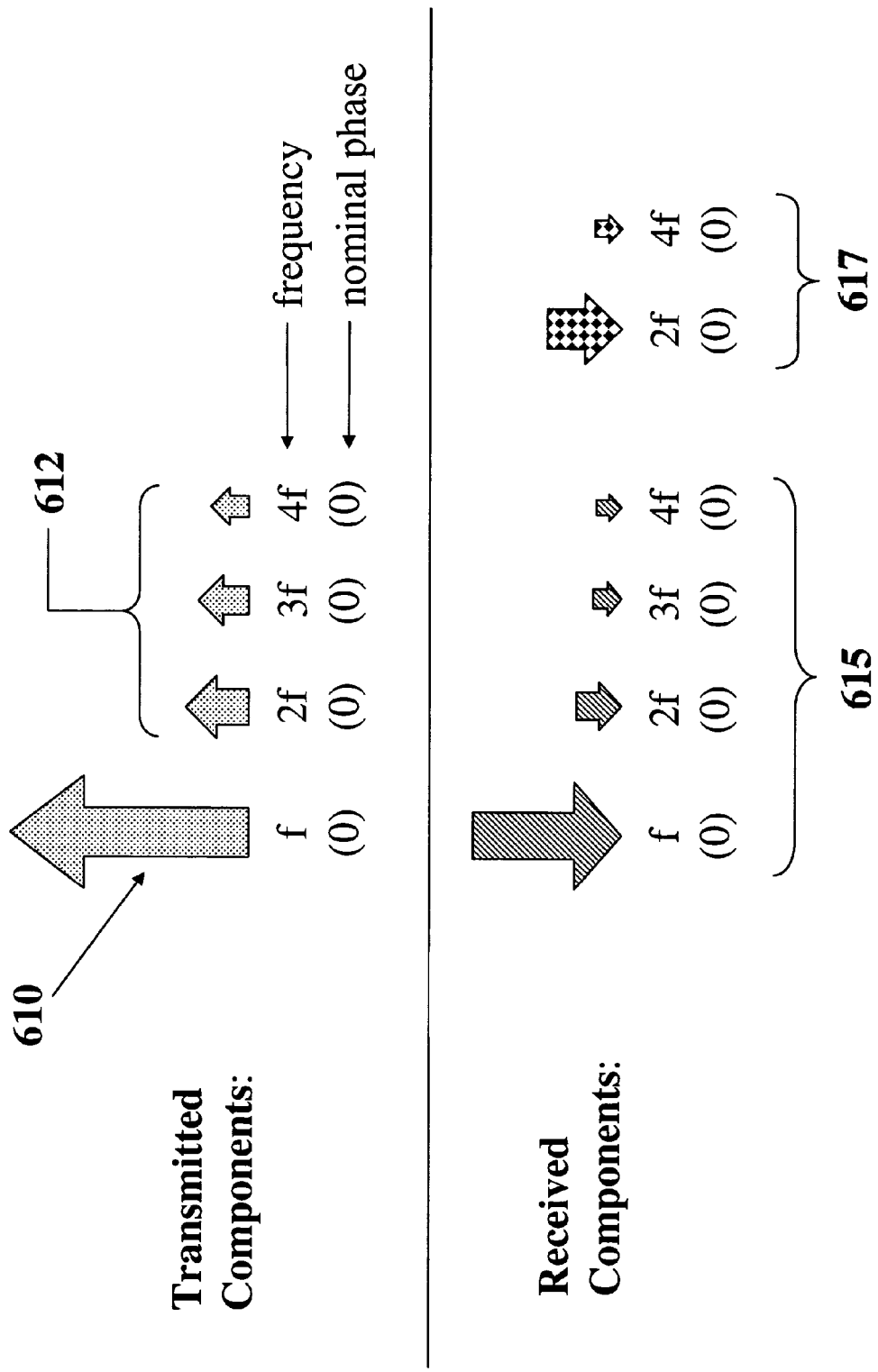
FIGS. 6A-6C illustrate the harmonic components transmitted and received by the first through third, respectively, firings as shown in FIG. 5.

FIG. 6A shows a detailed view of the harmonic components transmitted and received during the first firing 510 of FIG. 5. Transmitted components for the first firing 510 are shown in the upper half of FIG. 6A. The largest component of the cMUT's pressure output is the transmitted fundamental frequency 610, which is focused in elevation. The transmitted harmonic components 612 are generated internally to the cMUT due to its non-linear nature. Both the frequency and relative phase are shown for all the transmitted components 610, 612. Received components for the first firing 510 are shown in the lower half of FIG. 6A. The received components created by echoes off tissue structure 615 and the received components arising from non-linear generation in the tissue 617 (i.e., the conversion of the fundamental frequency 610 to 2 f and 4 f components during non-linear propagation through the tissue) are shown. Again, as before, both the frequency and relative phase for each of these received components 615, 617 are shown.

Figure 6B:
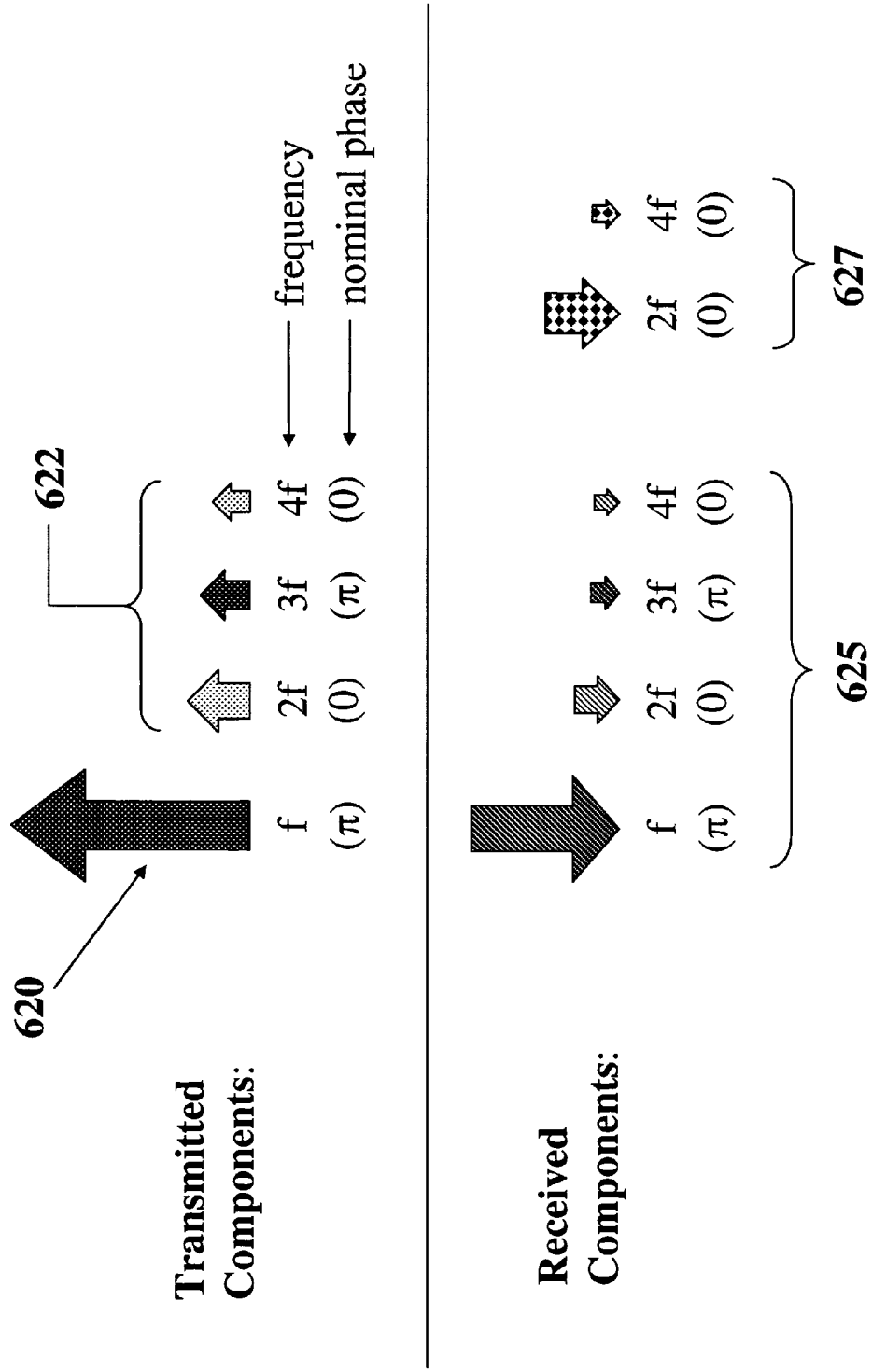

FIG. 6B shows the same information for the second firing 520 of FIG. 5 that FIG. 6A shows for the first firing 510 of FIG. 5. The transmitted fundamental frequency 620 in the second firing 520 and the transmitted harmonic components 622 that are generated internally in the cMUT are shown. Note that all of the transmitted odd harmonic components have a phase of $\pi$ (relative to those same components of the first firing 510), while all the transmitted even harmonic components have the same phase as their first firing 510 equivalents. Received components 625, 627 for the second firing 520 are shown in the lower half of FIG. 6B. Received components 625 represent those received components created by echoes off tissue structure. The relative phases of these received components 625 are preserved from the phases present at the time of firing. Received components 627 represent those received components arising from non-linear generation in the tissue. Note that the 2 f and 4 f components in received components 627 have the same phase as their counterparts in the first firing 520 (e.g., FIG. 6A, 617). This is because generation of the 2 f harmonic in tissue is insensitive to phase shifts of $\pm N \cdot \pi$ in the fundamental frequency source waveform.

Figure 6C:
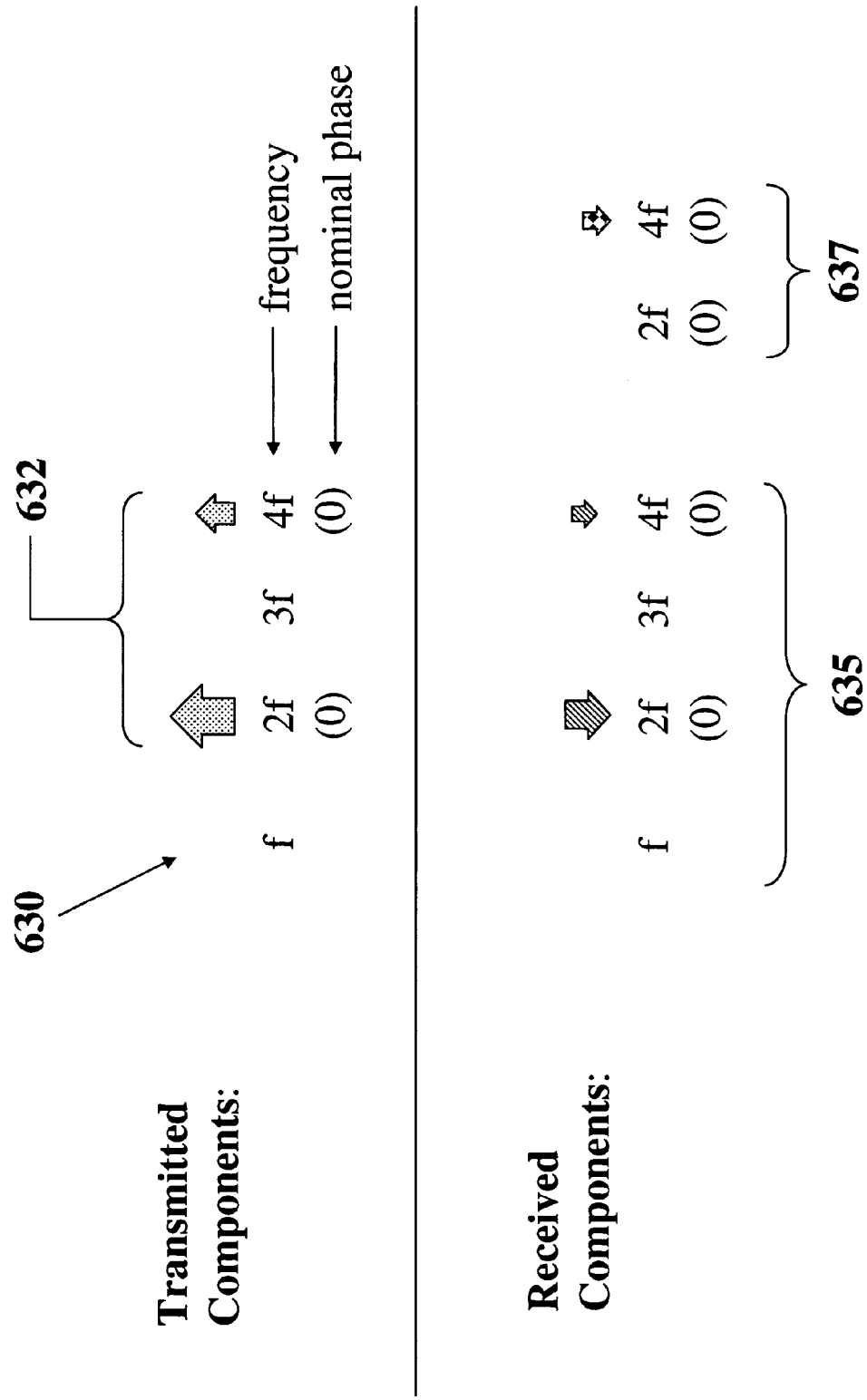

FIG. 6C illustrates a detailed view of the harmonic components transmitted and received during third firing 530 of FIG. 5. The absence of a transmitted fundamental frequency component 630 is consistent with the expected behavior of the alternating bias profile used in the third firing 530. The transmitted harmonic components 632 are generated internally in the cMUT. Note that only even harmonic components are present and those components have the same phase as their counterparts in the first two firings 510, 520. Received components for the third firing 530 are shown in the lower half of FIG. 6C. In the received components 635, only even harmonic frequency components from tissue echoes are received. Of significance is the fact that no 2 f harmonics are generated in the tissue due to the absence of the transmitted fundamental frequency component 630, and none therefore are received 637 during the third firing 530.

The formula below demonstrates how to mathematically combine the received components of the three separate firings 510, 520, 530 of FIG. 5 to isolate only those harmonics generated in the tissue.

$$F1+F2-(2*F3)=[\text{tissue-generated harmonics only}],$$

where F1 is the received voltage vs. time data from the first firing 510 of FIG. 5, F2 is the received voltage vs. time data from the second firing 520, and F3 is the received voltage vs. time data from the third firing 530. To cancel all received tissue-structure echoes from the transmitted fundamental frequency component and harmonics arising from non-linearities in the cMUT, simply add F1 to F2 and subtract two times F3. This equation works in the following way: by adding F1 to F2, the 1 f fundamental and 3 f harmonic components cancel due to their relative phase difference of $\pi$. However, adding these two also results in the doubling of all even harmonic components (both those generated in the tissue, and those originally generated in the cMUT itself). Thus, F1 added to F2 may not, by itself, yield a good harmonic image because the 2 f tissue-generated harmonic will be obscured by the 2 f harmonic generated internally in the. cMUT. Since the received components of F3 consist only of cMUT-generated harmonics and not the 2 f tissue-generated harmonics, they can be used to exactly subtract out the effect of the cMUT-generated harmonics from the result of adding F1 to F2. To reflect the fact that both F1 and F2 have cMUT-generated harmonics, we must double F3 before subtracting it from the result of F1 added to F2. This leaves only the desired tissue-generated harmonics.

It should be noted that the present invention is not limited to the specific sequence, composition, and combination of firings outlined in FIGS. 5-6. For example, those skilled in the art will understand that there are many different variations of transmit and receive bias patterns, firing sequences, and summing coefficients that will allow for the isolation of tissue or contrast generated harmonics and exclusion of cMUT-generated harmonics. Furthermore, it should be understood that inverting, phase shifting, or otherwise altering the RF signal supplied to the cMUT element may be used in conjunction with bias pattern inversions to achieve the same result. Further still, it should be noted that in the three-firing scheme described in FIGS. 5-6 of the present invention, the firing commonly referred to as the third firing 530 (i.e., the alternating polarity mode) may not be necessary to the extent that the cMUT-generated harmonics are sufficiently small or dispersed compared to the harmonics generated in the tissue. Also, a simple two-firing scheme could be used in conjunction with a cMUT array having a single controllable set of bias lines in elevation as a way to do harmonic imaging without requiring the RF waveform be inverted, phase shifted, or otherwise altered between the two firings.

Figure 7:
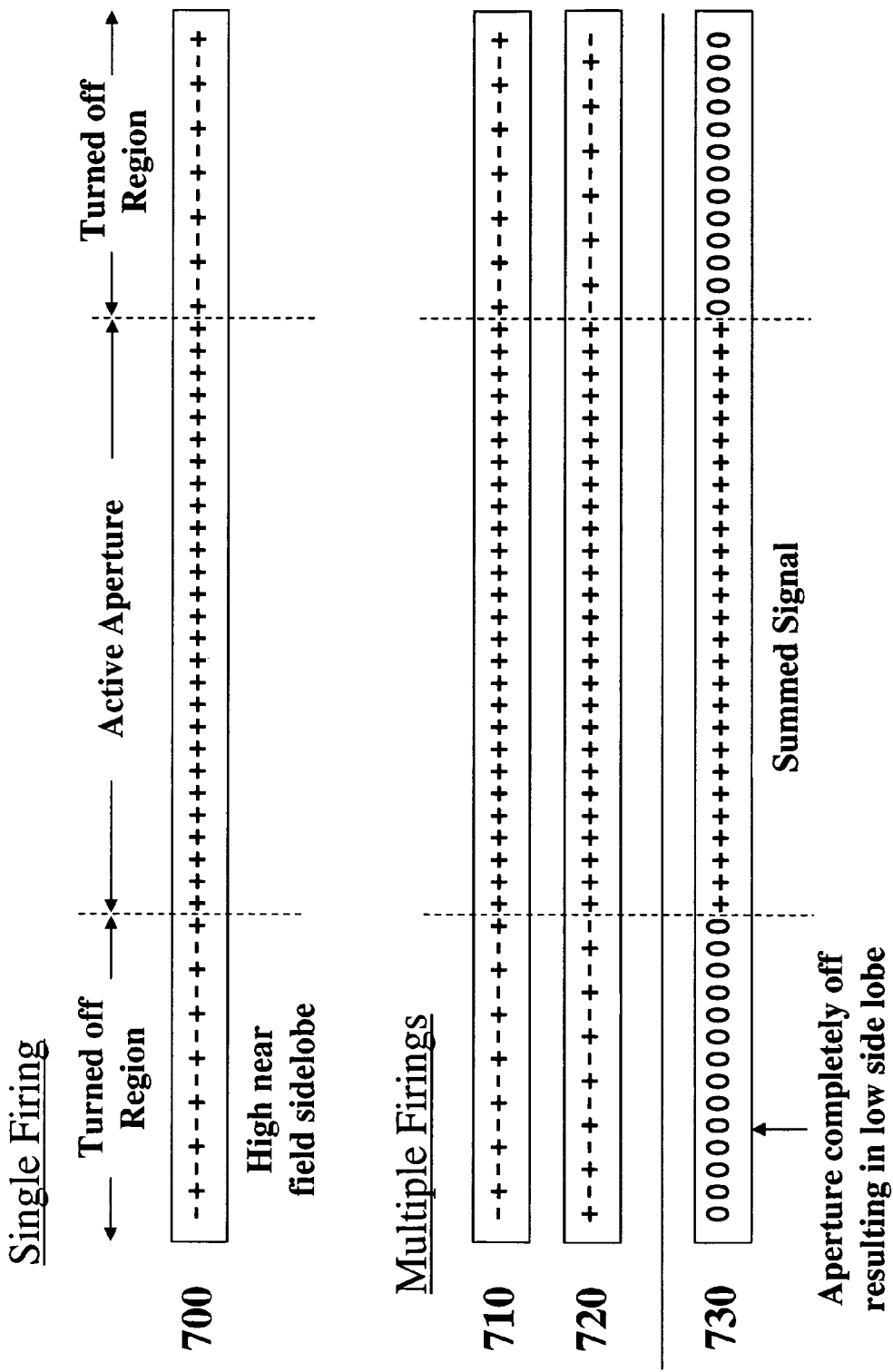
FIG. 7 illustrates a firing sequence for an embodiment of the present invention to improve sidelobe elevation focus.

Another embodiment of the present invention uses multiple firings from a cMUT array having individually addressable DC bias lines to improve the elevation focus compared to the best focus that can be achieved with a single firing. One specific example is provided in FIG. 7, which demonstrates a method to reduce the high sidelobe present in the near field of a single firing 700. Multiple firings 710, 720 can be combined 730 with separate transmit and receive biases to improve main lobe or side lobe characteristics.

Figure 8:
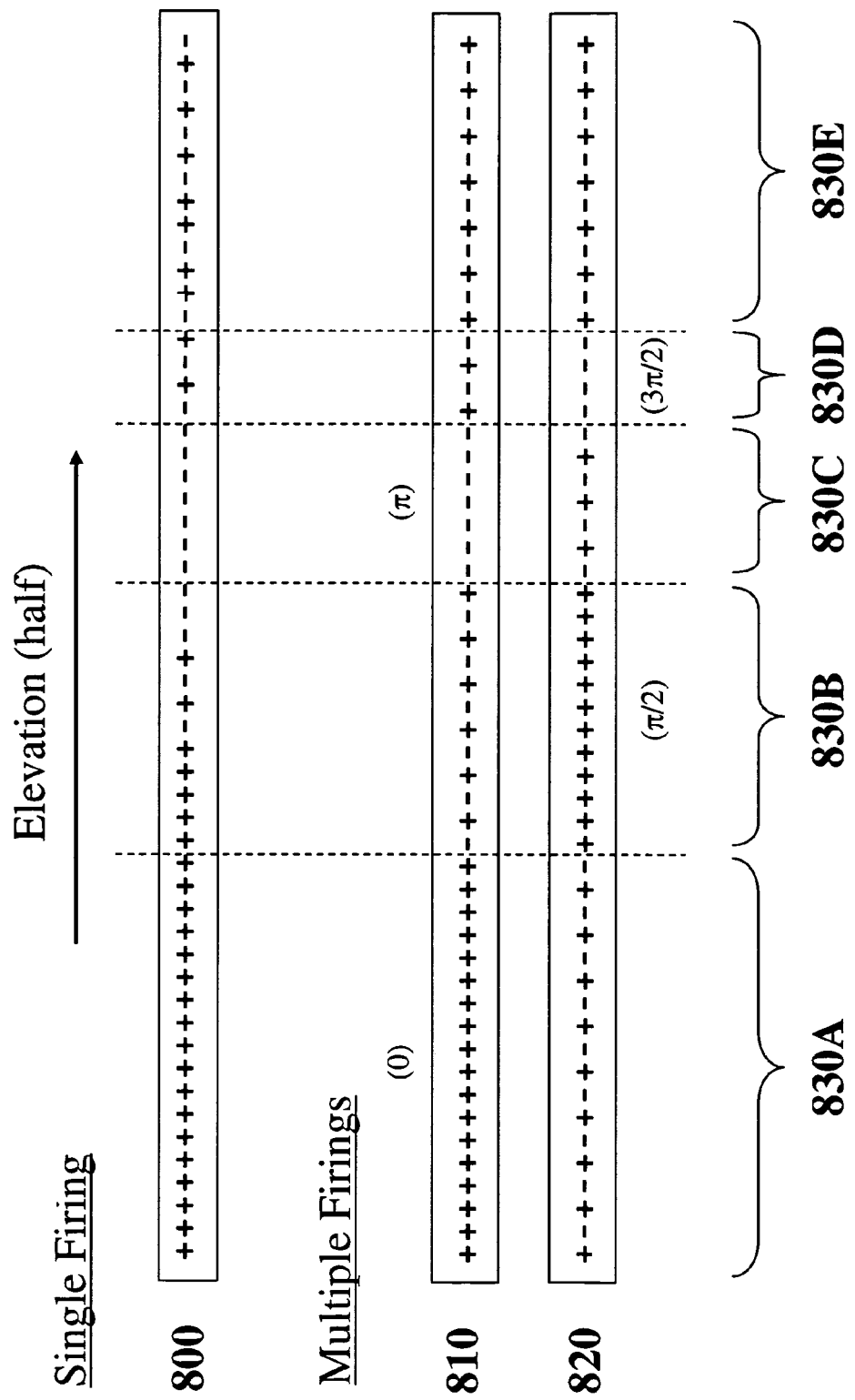
FIG. 8 illustrates a firing sequence for an embodiment of the present invention to improve focus in elevation.

Another specific example of a multi-firing scheme of the present invention is provided in FIG. 8, which illustrates how the elevation focus of a single firing 800 can be improved by two firings 810, 820 that are summed with a +π/2 phase shift. In this example, the single firing 800 is broken up into regions of '+' 830A, regions of '−' 830C, regions of 'transition' 830B, 830D and regions of 'off' 830E. In the first firing 810 of the multiple firing scheme, original regions of '+' 830A and '−' 830C are preserved, and the regions of 'transition' 830B, 830D are effectively turned off by finely alternating the bias polarity in those same locations. In the second firing 820, original regions of '+' 830A and '−' 830C are effectively turned off, and regions of 'transition' 830B, 830D become either solid '+' or solid '−', respectively. In producing the final result, the received waveforms from the first firing 810 and the second 820 are summed, but only after a phase shift of +π/2 is applied to the second firing 820. This summing of the waveforms one quarter wavelength out of phase yields a quantized phase set $\{0, \pi/2, \pi, \text{ and } 3\pi/2\}$, as compared to the binary phase set $\{0, \pi\}$ characteristic of the single firing 900 case. This enlarged quantized phase set allows for more precise phase contouring across the elevation of the cMUT element, and consequently, an improved elevation focus in the field.

Apparent to those skilled in the art is the richness of this scheme in variations. The phase delay described above can also be applied to transmit signal instead of the received signal. Similarly, instead of phase shift, time delay could be used. A variety of different bias patterns may be used in two or more firings, and the received signals from these firings may be combined in many different ways. Also, use of dissimilar RF signals in each firing may be used in conjunction with alterations in bias pattern. This same technique can also be used to steer the beam by a small angle in the elevation direction.

Figure 9:
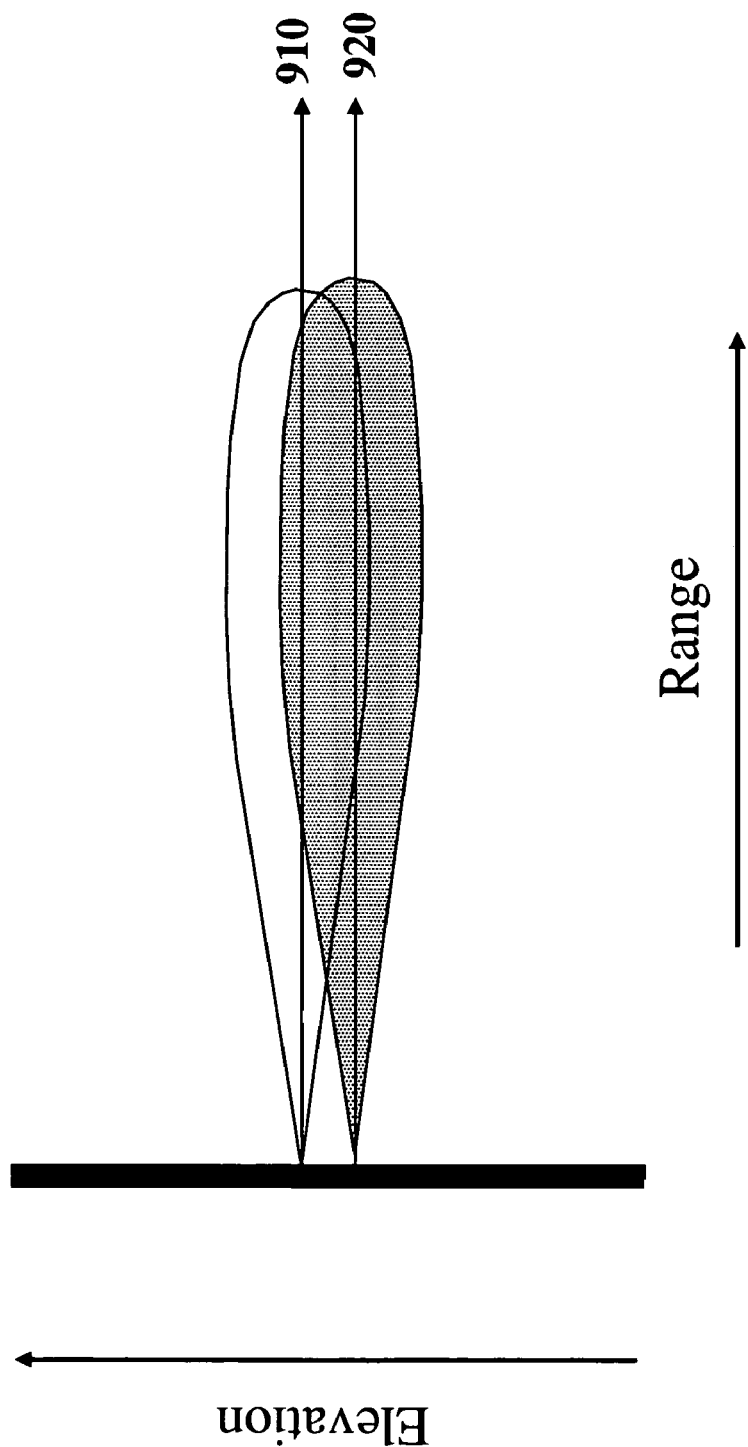
FIG. 9 illustrates compounding with two different elevation vectors according to an embodiment of the present invention.

The above mentioned techniques can also be used to do compounding to reduce speckle in the ultrasound image. An implementation of this aspect of the present invention is illustrated in FIG. 9. Initially, a first vector 910 is fired, and the received data are acquired, magnitude detected and stored. Next, a second vector 920 that is slightly shifted in elevation plane is fired. This elevation plane shift can be achieved just shifting the bias pattern as previously described. The received data from the second vector 920 is magnitude detected and combined with the first vector 910 stored data. This results in a compounded image that has reduced speckle. The shift between the two vectors 910, 920 should be large enough to provide speckle de-correlation and small enough not to degrade the elevation slice thickness. The gap between the two vectors 910, 920 depends upon the speckle correlation length and the desired amount of speckle compounding. The gap between two compounding vectors would also depend upon how much elevation slice thickness degradation can be tolerated in the image. As an example, the gap could be the same as the −6 dB elevation beam width of the imaging setup, or approximately 1 mm for a 9 MHz probe. Compounding can also be applied to combine two or more firings that are focused at different ranges.

In yet another embodiment, the bias pattern applied to a transducer array is periodically inverted in order to remove or delay the deleterious effects that high electric fields can have on insulators. In this embodiment, the bias pattern switching may have no effect on the focusing of the transducer. For example, for a transducer with at least one bias polarity, that polarity, and any other polarities spatially distributed across the transducer can be inverted at a frequency of at least 1 Hz. Because the time constants of charge trapping and other insulator degradation mechanisms are typically long, a 1 Hz oscillation of bias voltage is adequate. Of course, it will be apparent to one skilled in the art that faster or slower inversion rates may be necessary for different insulator and material systems. As long as the inversion frequency is relatively slow compared to imaging functions, the inversion can occur at a brief interval of time in such a manner that it does not materially impact imaging frame rate.

Although the present invention has been particularly described with reference to the preferred embodiments thereof, it should be readily apparent to those of ordinary skill in the art that changes and modifications in the form and details thereof may be made without departing from the spirit and scope of the invention. It is intended that the appended claims. include such changes and modifications.

What is claimed is:

1. A method of improving harmonic imaging performance of at least one element of a capacitive microfabricated ultrasonic transducer (cMUT) array, the at least one element including a plurality of transducer cells, comprising the steps of:
   operating the cMUT array using bias voltage polarity control; and
   for the at least one element, combining a plurality of received data collected from a plurality of events for a same image area to form a single waveform output, wherein:
       the plurality of events includes a plurality of receive events and an associated plurality of transmit events, and
       the pluralities of receive and transmit events use at least two different bias voltage polarity patterns.

2. The method of claim 1, wherein:
   each one of the plurality of transmit events uses a transmit bias voltage polarity pattern and a transmit waveform; and
   each one of the plurality of receive events uses a receive bias voltage polarity pattern.

3. The method of claim 2, wherein at least one of the plurality of transmit bias voltage polarity patterns is different from other ones of the plurality of transmit bias voltage polarity patterns and different from the plurality of receive bias voltage polarity patterns.

4. The method of claim 2, wherein at least one of the plurality of receive bias voltage polarity patterns is different from other ones of the plurality of receive bias voltage polarity patterns and different from the plurality of transmit bias voltage polarity patterns.

5. The method of claim 1, further comprising the step of, immediately prior to the step of combining, applying a phase shift to at least one of the plurality of received data.

6. The method of claim 5, wherein the phase shift is $\{pi/2\}$.

7. A method of operating a capacitive microfabricated ultrasonic transducer (cMUT), the cMUT being bias voltage polarity controlled, comprising the steps of:
   performing a first transmit for an image area, the first transmit having first transmit characteristics;
   performing a first receive of first data resulting from the first transmit, the first receive having first receive characteristics;
   storing the first data;
   performing a second transmit for the image area, the second transmit having second transmit characteristics; and
   performing a second receive of second data resulting from the second transmit, the second receive having second receive characteristics,
   wherein the first and second transmits and receives use at least two different bias voltage polarity patterns.

8. The method of claim 7, wherein:
   the first transmit using a first transmit bias voltage polarity pattern and a first transmit waveform;

the first receive using a first receive bias voltage polarity pattern;

the second transmit using a second transmit bias voltage polarity pattern and a second transmit waveform; and the second receive using a second receive bias voltage polarity pattern.

9. The method of claim 8, wherein one or more of the first and second transmit and receive bias voltage polarity patterns is different from another one of the first and second transmit and receive bias voltage polarity patterns.

10. The method of claim 7, further comprising:
combining the stored first data and the second data to form a single waveform output.

11. The method of claim 10, further comprising, immediately prior to the step of combining, applying a phase shift to the second data.

12. The method of claim 11, wherein the phase shift is {pi/2}.

13. The method of claim 8, further comprising:
combining the stored first data and the second data to form a single waveform output.

14. The method of claim 13, wherein:
the first bias voltage polarity pattern uses a DC magnitude of at least 70 Volts and a first bias polarity that is positive (+) across all of the first bias voltage polarity pattern;
the second bias voltage polarity pattern uses the DC magnitude of at least 70 Volts and a second bias polarity that is negative (−) across all of the second bias voltage polarity pattern.

15. The method of claim 14, wherein the step of combining uses a formula {F1+F2}, wherein:
F1 is a first voltage versus time data of the stored first data; and
F2 is a second voltage versus time data of the second data.

16. The method of claim 13, wherein:
the first transmit bias voltage polarity pattern uses an elevation focus pattern and is optimized for a fundamental frequency (1 f); and
the first receive bias voltage polarity pattern uses the elevation focus pattern and is optimized for 2 f frequencies.

17. The method of claim 16, wherein:
the second transmit bias voltage polarity pattern is a polarity inverse of the first transmit bias voltage polarity pattern; and
the second receive bias voltage polarity pattern is the same as the first receive bias voltage polarity pattern.

18. The method of claim 17, wherein the step of combining uses a formula {F1+F2}, wherein:
F1 is a first voltage versus time data of the stored first data; and
F2 is a second voltage versus time data of the second data.

19. The method of claim 7, further comprising:
storing the second data;
performing a third transmit for the image area, the third transmit having third transmit characteristics;
performing a third receive of third data resulting from the third transmit, the third receive having third receive characteristics; and
combining the stored first data, the stored second data and the third data to form a single waveform output.

20. The method of claim 19, wherein:
the first transmit characteristics include a first transmit bias voltage polarity pattern and a first transmit waveform;
the first receive characteristics include a first receive bias voltage polarity pattern;

the second transmit characteristics include a second transmit bias voltage polarity pattern and a second transmit waveform;
the second receive characteristics include a second receive bias voltage polarity pattern;
the third transmit characteristics include a third transmit bias voltage polarity pattern and a third transmit waveform; and
the third receive characteristics include a third receive bias voltage polarity pattern.

21. The method of claim 20, wherein one or more of the first, second and third transmit and receive bias voltage polarity patterns are different from another one of the first, second and third transmit and receive bias voltage polarity patterns.

22. The method of claim 20, wherein:
the first transmit bias voltage polarity pattern uses an elevation focus pattern and is optimized for a fundamental frequency (1 f); and
the first receive bias voltage polarity pattern uses the elevation focus pattern and is optimized for a second harmonic (2 f) frequency.

23. The method of claim 22, wherein:
the second transmit bias voltage polarity pattern is a polarity inverse of the first transmit bias voltage polarity pattern; and
the second receive bias voltage polarity pattern is the same as the first receive bias voltage polarity pattern.

24. The method of claim 23, wherein:
the third transmit bias voltage polarity pattern uses an alternating polarity pattern and is optimized to suppress ultrasound transmission around at least one frequency, the at least one frequency being selected from the fundamental frequency and odd harmonics of the fundamental frequency; and
the third receive bias voltage polarity pattern is the same as the first receive bias voltage polarity pattern.

25. The method of claim 24, wherein the step of combining uses a formula {F1+F2−(2*F3)}, wherein:
F1 is a first voltage versus time data of the stored first data;
F2 is a second voltage versus time data of the stored second data; and
F3 is a third voltage versus time data of the third data.

26. A method of improving elevation focus in a capacitive microfabricated ultrasonic transducer (cMUT), the cMUT being bias voltage polarity controlled, comprising the steps of:
operating the cMUT using bias voltage polarity control; and
combining, from a single image area, a first received data and a second received data resulting from a first transmit event and a second transmit event of the cMUT operation, respectively, to form a single waveform output having a reduced high sidelobe in a near field, wherein the first and second received data result from at least two different bias voltage polarity patterns, the at least two different bias voltage polarity patterns resulting in interference when the first and second received data are combined, the interference providing the reduced high sidelobe in the near field as compared to a non-reduced high sidelobe caused by combining without any different bias voltage polarity patterns.

27. The method of claim 26, wherein:
each of the first and second transmit events uses a first and second transmit bias voltage polarity pattern, respectively, and a first and second transmit waveform, respectively; and each of the first and second received data is received using a first and second receive bias voltage polarity pattern, respectively.

28. The method of claim 27, wherein:
each of the first and second transmit bias voltage polarity pattern includes a turned-off region, the turned-off region having an alternating polarity pattern and the turned-off region of the first transmit bias voltage polarity pattern being an inversion of the turned-off region of the second transmit bias voltage polarity pattern.

29. The method of claim 28, wherein the step of combining uses a formula {F1+F2}, wherein:
F1 is a first voltage versus time data of the first received data; and
F2 is a second voltage versus time data of the second received data.

30. A method of operating a capacitive microfabricated ultrasonic transducer (cMUT), the cMUT being bias voltage polarity controlled, comprising the steps of:
operating the cMUT using a first operational bias voltage polarity pattern during a first transmit-receive sequence; and
operating the cMUT using a second operational bias voltage polarity pattern during a second transmit-receive sequence, the second operational bias voltage pattern being a polarity inverse of the first operational bias voltage polarity pattern.

31. The method of claim 30, further including the step of alternating between the first operating step and the second operating step at a frequency slower than about 1 Hz.

32. A method of reducing speckle in an ultrasound image using a capacitive microfabricated ultrasonic transducer (cMUT), the cMUT being bias voltage polarity controlled, comprising the steps of:
performing a first transmit for an image area, the first transmit using a first transmit bias polarity pattern;
performing a first receive of first data resulting from the first transmit using a first receive bias polarity pattern;
storing the first data;
performing a second transmit for the image area, the second transmit using a second transmit bias polarity pattern, the second bias polarity pattern being a shifted first transmit bias polarity pattern such that the second transmit is a spatially shifted first transmit;
performing a second receive of second data resulting from the second transmit; and combining the first data and the second data.

33. A capacitive microfabricated ultrasonic transducer (cMUT) array, the cMUT array comprising at least one transducer element that includes a plurality of transducer cells, comprising:
means for operating the cMUT array using bias voltage polarity control; and
for the at least one element, means for combining a plurality of received data collected from a plurality of events for a same image area to form a single waveform output, wherein:
the plurality of events includes a plurality of receive events and an associated plurality of transmit events, and the pluralities of receive and transmit events use at least two different bias voltage polarity patterns.

34. The cMUT array of claim 33, wherein:
each one of the plurality of transmit events uses a transmit bias voltage polarity pattern and a transmit waveform; and
each one of the plurality of receive events uses a receive bias voltage polarity pattern.

35. The cMUT array of claim 34, wherein at least one of the plurality of transmit bias voltage polarity patterns is different from other ones of the plurality of transmit bias voltage polarity patterns and different from the plurality of receive bias voltage polarity patterns.

36. The cMUT array of claim 34, wherein at least one of the plurality of receive bias voltage polarity patterns is different from other ones of the plurality of receive bias voltage polarity patterns and different from the plurality of transmit bias voltage polarity patterns.

37. The cMUT array of claim 33, further comprising the step of, immediately prior to the step of combining, means for applying a phase shift to at least one of the plurality of received data.

38. The cMUT array of claim 37, wherein the phase shift is {pi/2}.

39. A capacitive microfabricated ultrasonic transducer (cMUT), the cMUT being bias voltage polarity controlled, comprising:
means for performing a first transmit for an image area, the first transmit having first transmit characteristics;
means for performing a first receive of first data resulting from the first transmit, the first receive having first receive characteristics;
means for storing the first data;
means for performing a second transmit for the image area, the second transmit having second transmit characteristics; and
means for performing a second receive of second data resulting from the second transmit, the second receive having second receive characteristics,
wherein the first and second transmits and receives use at least two different bias voltage polarity patterns.

40. The cMUT of claim 39, wherein:
the first transmit uses a first transmit bias voltage polarity pattern and a first transmit waveform;
the first receive uses a first receive bias voltage polarity pattern;
the second transmit uses a second transmit bias voltage polarity pattern and a second transmit waveform; and
the second receive uses a second receive bias voltage polarity pattern.

41. The cMUT of claim 40, wherein one or more of the first and second transmit and receive bias voltage polarity patterns is different from another one of the first and second transmit and receive bias voltage polarity patterns.

42. The cMUT of claim 39, further comprising:
means for combining the stored first data and the second data to form a single waveform output.

43. The cMUT of claim 42, further comprising, immediately prior to the means for combining, means for applying a phase shift to the second data.

44. The cMUT of claim 43, wherein the phase shift is {pi/2}.

45. The cMUT of claim 40, further comprising:
means for combining the stored first data and the second data to form a single waveform output.

46. The cMUT of claim 45, wherein:
the first bias voltage polarity pattern uses a DC magnitude of at least 70 Volts and a first bias polarity that is positive (+) across all of the first bias voltage polarity pattern;
the second bias voltage polarity pattern uses the DC magnitude of at least 70 Volts and a second bias polarity that is negative (−) across all of the second bias voltage polarity pattern.

47. The cMUT of claim 46, wherein the means for combining uses a formula {F1+F2}, wherein:
F1 is a first voltage versus time data of the stored first data; and
F2 is a second voltage versus time data of the second data.

48. The cMUT of claim 45, wherein:
the first transmit bias voltage polarity pattern uses an elevation focus pattern and is optimized for a fundamental frequency (1 f); and
the first receive bias voltage polarity pattern uses the elevation focus pattern and is optimized for harmonic frequencies.

49. The cMUT of claim 48, wherein:
the second transmit bias voltage polarity pattern is a polarity inverse of the first transmit bias voltage polarity pattern; and
the second receive bias voltage polarity pattern is the same as the first receive bias voltage polarity pattern.

50. The cMUT of claim 49, wherein the means for combining uses a formula {F1+F2}, wherein:
F1 is a first voltage versus time data of the stored first data; and
F2 is a second voltage versus time data of the second data.

51. The cMUT of claim 39, further comprising:
means for storing the second data;
means for performing a third transmit for the image area, the third transmit having third transmit characteristics;
means for performing a third receive of third data resulting from the third transmit, the third receive having third receive characteristics; and
means for combining the stored first data, the stored second data and the third data to form a single waveform output.

52. The cMUT of claim 51, wherein:
the first transmit characteristics include a first transmit bias voltage polarity pattern and a first transmit waveform;
the first receive characteristics include a first receive bias voltage polarity pattern;
the second transmit characteristics include a second transmit bias voltage polarity pattern and a second transmit waveform;
the second receive characteristics include a second receive bias voltage polarity pattern;
the third transmit characteristics include a third transmit bias voltage polarity pattern and a third transmit waveform; and
the third receive characteristics include a third receive bias voltage polarity pattern.

53. The cMUT of claim 52, wherein one or more of the first, second and third transmit and receive bias voltage polarity patterns is different from another one of the first, second and third transmit and receive bias voltage polarity patterns.

54. The cMUT of claim 52, wherein:
the first transmit bias voltage polarity pattern uses an elevation focus pattern and is optimized for a fundamental frequency (1 f); and
the first receive bias voltage polarity pattern uses the elevation focus pattern and is optimized for harmonic frequencies.

55. The cMUT of claim 54, wherein:
the second transmit bias voltage polarity pattern is a polarity inverse of the first transmit bias voltage polarity pattern; and
the second receive bias voltage polarity pattern is the same as the first receive bias voltage polarity pattern.

56. The cMUT of claim 55, wherein:
the third transmit bias voltage polarity pattern uses an alternating polarity pattern and is optimized to suppress ultrasound transmission around at least one frequency, the at least one frequency being selected from the fundamental frequency and odd harmonics of the fundamental frequency; and
the third receive bias voltage polarity pattern is the same as the first receive bias voltage polarity pattern.

57. The cMUT of claim 56, wherein the means for combining uses a formula {F1+F2−(2*F3)}, wherein:
F1 is a first voltage versus time data of the stored first data;
F2 is a second voltage versus time data of the stored second data; and
F3 is a third voltage versus time data of the third data.

* * * * *